Nov. 11, 1952    A. SMERECK    2,617,428
ASH TRAY AND SUPPORT
Filed July 3, 1950
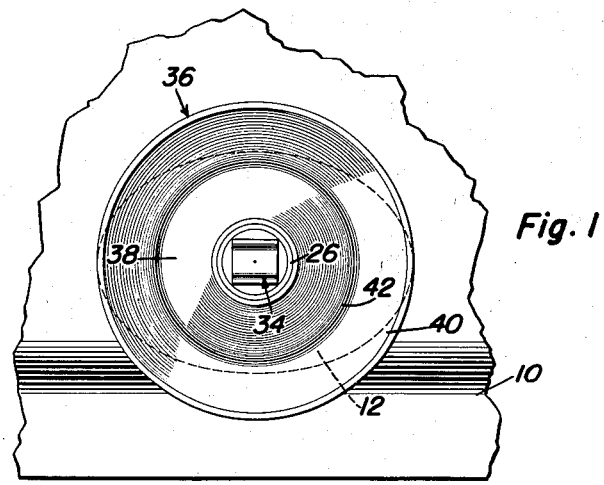
Fig. 1
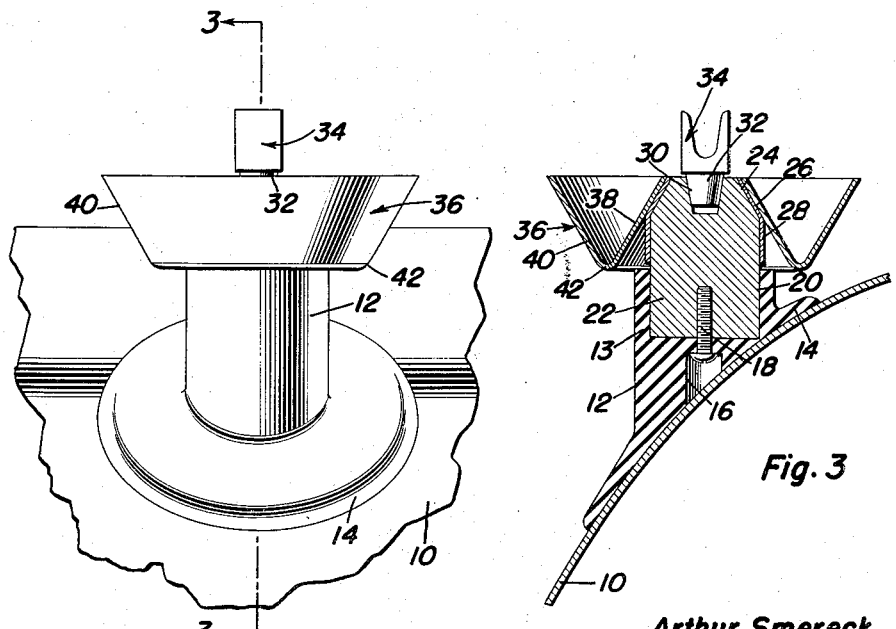
Fig. 2
Fig. 3
Arthur Smereck
INVENTOR.
BY
*Attorneys*

Patented Nov. 11, 1952

2,617,428

UNITED STATES PATENT OFFICE 2,617,428

ASH TRAY AND SUPPORT

Arthur Smereck, Detroit, Mich., assignor to Product Development Engineering Research and Promotion Corporation, Detroit, Mich., a corporation of Michigan Application July 3, 1950, Serial No. 171,935

1 Claim. (Cl. 131—241)

This invention relates to improvements in ash trays adapted particularly for use inside an automobile and relates to subject matter similar to my co-pending applications Serial No. 140,013, filed on January 23, 1950, and Serial No. 172,307, filed on July 6, 1950.

An object of this invention is to provide an improved ash receptacle or tray for an automobile which includes a base consisting of a suction cup which has an offset lower end so as to be capable of fastening to a curved component of a vehicle and yet hold the stud which rises therefrom in a vertical position, the stud having a cigar and cigarette holder mounted for rotation therein and having an improved receptacle removably disposed on the upper end of the stud, the receptacle being held in place between the inner tapered side of the receptacle and the tapered wall of the stud.

Ancillary objects and features of importance will become apparent in following the description of the illustrated form of the invention.

In the drawings:

Figure 1 is a plan view of the device showing it attached to a fragmentary part of a dashboard of a vehicle;

Figure 2 is an elevational view of the structure in Figure 1, and;

Figure 3 is a longitudinal sectional view taken substantially on the line 3—3 of Figure 2 and in the direction of the arrows.

The instant invention deals with ash trays which are mounted by the owner of the vehicle on a convenient part thereof, for example the dashboard or metallic trim adjacent the back seat of the vehicle. The article illustrated is best suited as a unit to be purchased in an accessory store but could, if found desirable, be used as original equipment in vehicles.

There is a fragmentary part 10 of a dashboard illustrated in the drawings which illustrates a suggested location on which the suction cup 12 may be disposed. This suction cup has an offset boss 13 and an offset lower part 14 so as to conform to the general curvature of a curved part of the dashboard 10. A well 16 is formed in the suction cup to accommodate the screw 18 which passes into the recess 20 of the suction cup. A stud 22 is held in the recess 20 by means of the screw 18 and this stud is provided with a tapered wall 24 at its upper end. The tapered wall is preferably in the shape of a frustum of a cone and there is a skirt 26 disposed thereon. This skirt has a lower cylindrical portion 28 arranged around a part of the stud, and an upper portion in the shape of a frustum of a cone which rests upon the tapered upper part of the stud 22.

A tapered bore 30 is formed in the upper end of the vertical stud 22 and has a tapered spindle 32 removably disposed therein. By this construction the cigar and cigarette holder 34 which is attached to the upper end of the spindle 32 may be rotated about a vertical axis.

An ash receptacle 36 is disposed on the stud 22 and specifically on the skirt 26 which is carried by the stud. The receptacle is toroidal or and annular in plan form and consists of an inner wall 38 which tapers downwardly toward the outer wall 40, the outer wall tapering toward the inner wall to which it is joined thereby forming the bottom 42 of the receptacle which is smoothly curved for facility of cleaning.

The inner wall 38 of the receptacle 36 is in the shape of a frustum of a cone and is removably seated upon the tapered part of the skirt 26. Accordingly the receptacle 36 is held in place on the skirt 26 of the stud 22.

The size of the cigarette and cigar holder is such as to allow the receptacle 36 to be lifted from the stud 22 without moving the cigar and cigarette holder. Hence, the receptacle may be emptied by simply lifting it and then replaced by simply placing it upon the skirt 26 on the stud 22.

In use of the device it is simply placed on a suitable component of a vehicle or fastened to any stationary object. Where the object or component of the vehicle is curved, the offset type suction cup is employed. In other instances, as for example the placement of the device on a desk, a purely conventional suction cup is employed. In either case, the suction cup forms a base for the ash tray.

Thereafter, the cigar and cigarette holder may be used in the expected manner and may be rotated to such a position as will be convenient for the user of the device. When the ash receptacle 36 becomes filled, it is simply lifted, emptied and then replaced.

Having described the invention, what is claimed as new is:

An ash receptacle comprising a vertical post including a substantially frusto-conical upper end portion and further having a tapered socket in said upper end portion, means for mounting the post in a vertical position, an annular tray of substantially V-shaped transverse section removably and rotatably mounted on the post and having its inner peripheral portion resting on said frusto-conical upper end portion of said post, and a removable cigarette holder frictionally secured in the socket within the confines of the inner periphery of the tray.

ARTHUR SMERECK.

REFERENCES CITED

The following references are of record in the file of this patent:

UNITED STATES PATENTS

| Number | Name | Date |
| --- | --- | --- |
| 1,671,813 | Clarke | May 29, 1928 |
| 1,727,515 | Mendle | Sept. 10, 1929 |
| 1,932,625 | Mopple | Oct. 31, 1933 |
| 2,000,920 | Campbell | May 14, 1935 |
| 2,315,608 | Ferguson | Apr. 6, 1943 |

FOREIGN PATENTS

| Number | Country | Date |
| --- | --- | --- |
| 268,990 | Great Britain | Apr. 14, 1927 |
| 470,321 | Great Britain | Aug. 12, 1937 |